US009738286B1

(12) United States Patent
Trent et al.

(10) Patent No.: US 9,738,286 B1
(45) Date of Patent: Aug. 22, 2017

(54) CLUTCH FOR CONTINUOUSLY VARIABLE TRANSMISSION AND METHOD OF OPERATING CLUTCH

(71) Applicant: Ford Global Technologies, LLC, Dearborn, MI (US)

(72) Inventors: James Trent, South Lyon, MI (US); Norman Jerry Bird, Plymouth, MI (US); Matthew Thomas Trent, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/181,486

(22) Filed: Jun. 14, 2016

(51) Int. Cl.
| *F16D 11/06* | (2006.01) |
| *B60W 30/20* | (2006.01) |
| *B60W 10/02* | (2006.01) |
| *B60W 10/06* | (2006.01) |
| *F16D 48/06* | (2006.01) |

(52) U.S. Cl.
CPC .......... *B60W 30/20* (2013.01); *B60W 10/02* (2013.01); *B60W 10/06* (2013.01); *F16D 48/064* (2013.01); *B60W 2710/02* (2013.01); *B60W 2710/0666* (2013.01); *F16D 2500/10412* (2013.01); *F16D 2500/3114* (2013.01); *F16D 2500/507* (2013.01)

(58) Field of Classification Search
None
See application file for complete search history.

(56) References Cited

U.S. PATENT DOCUMENTS

| 6,401,853 B1 * | 6/2002 | Turski ................. F02D 41/0087 180/197 |
| 8,641,571 B2 | 2/2014 | Ichikawa et al. |
| 8,926,472 B2 | 1/2015 | Shinojima et al. |
| 9,517,694 B2 * | 12/2016 | Nolte ..................... B60K 23/04 |
| 2016/0159187 A1 * | 6/2016 | Mohamed .......... B60G 17/0164 701/37 |

FOREIGN PATENT DOCUMENTS

| EP | 2262656 B1 | 9/2012 |
| FR | 2807489 B1 | 1/2007 |
| GB | 1537345 A | 12/1978 |

\* cited by examiner

*Primary Examiner* — Dirk Wright
(74) *Attorney, Agent, or Firm* — James Dottavio; Brooks Kushman, P.C.

(57) ABSTRACT

A vehicle including a continuously variable transmission including a gear selectively locked to an output shaft via a clutch actuated by an electric coil. The vehicle also includes a controller configured to, in response to wheel hop being detected, energize the coil to disengage the clutch allowing the gear and the output shaft to rotate independently of each other.

20 Claims, 10 Drawing Sheets

CLUTCH FOR CONTINUOUSLY VARIABLE TRANSMISSION AND METHOD OF OPERATING CLUTCH

TECHNICAL FIELD

This disclosure relates to the field of vehicle clutches. More particularly, the disclosure teaches controls for operating an electro-magnetically actuated clutch disposed within a continuously variable transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Some transmissions, called discrete-ratio transmissions, are configured to establish a finite number of speed ratios between an input shaft and an output shaft. When the currently selected ratio is no longer appropriate, a discrete ratio transmission must shift to a different one of the available speed ratios. Other transmissions, called continuously variable transmissions, are capable of establishing any speed ratio between lower and upper limits. Continuously variable transmissions are capable of making frequent fine speed ratio adjustments that are not perceivable by vehicle occupants.

SUMMARY

According to one embodiment, a vehicle including a continuously variable transmission including a gear selectively locked to an output shaft via a clutch actuated by an electric coil. The vehicle also includes a controller configured to, in response to wheel hop being detected, energize the coil to disengage the clutch allowing the gear and the output shaft to rotate independently of each other.

According to another embodiment, a vehicle includes a continuously variable transmission including a clutch. The clutch has an inner race fixed to an output shaft, an outer race fixed to a gear, and pawls. The pawls are biased to a deployed position in which the pawls lock the races placing the gear and shaft in a fixed relationship, and are movable to a tucked position in which the races are unlocked. The clutch further includes an armature configured to move the pawls. The clutch is controlled by a controller. The controller is configured to, in response to wheel hop being detected, actuate the armature to move the pawls to the tucked position to unlock the races allowing the gear and shaft to rotate independently of each other.

According to yet another embodiment, a method is presented for controlling an output-shaft clutch of a continuously variable transmission. The method includes, in response to wheel hop being detected, energizing an electric coil to unlock the clutch allowing an output shaft that extends through the clutch to rotate independently of a gear fixed to the clutch. The method further includes, in response to wheel hop ending, de-energizing the coil to lock the clutch and fix the gear to the output shaft.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
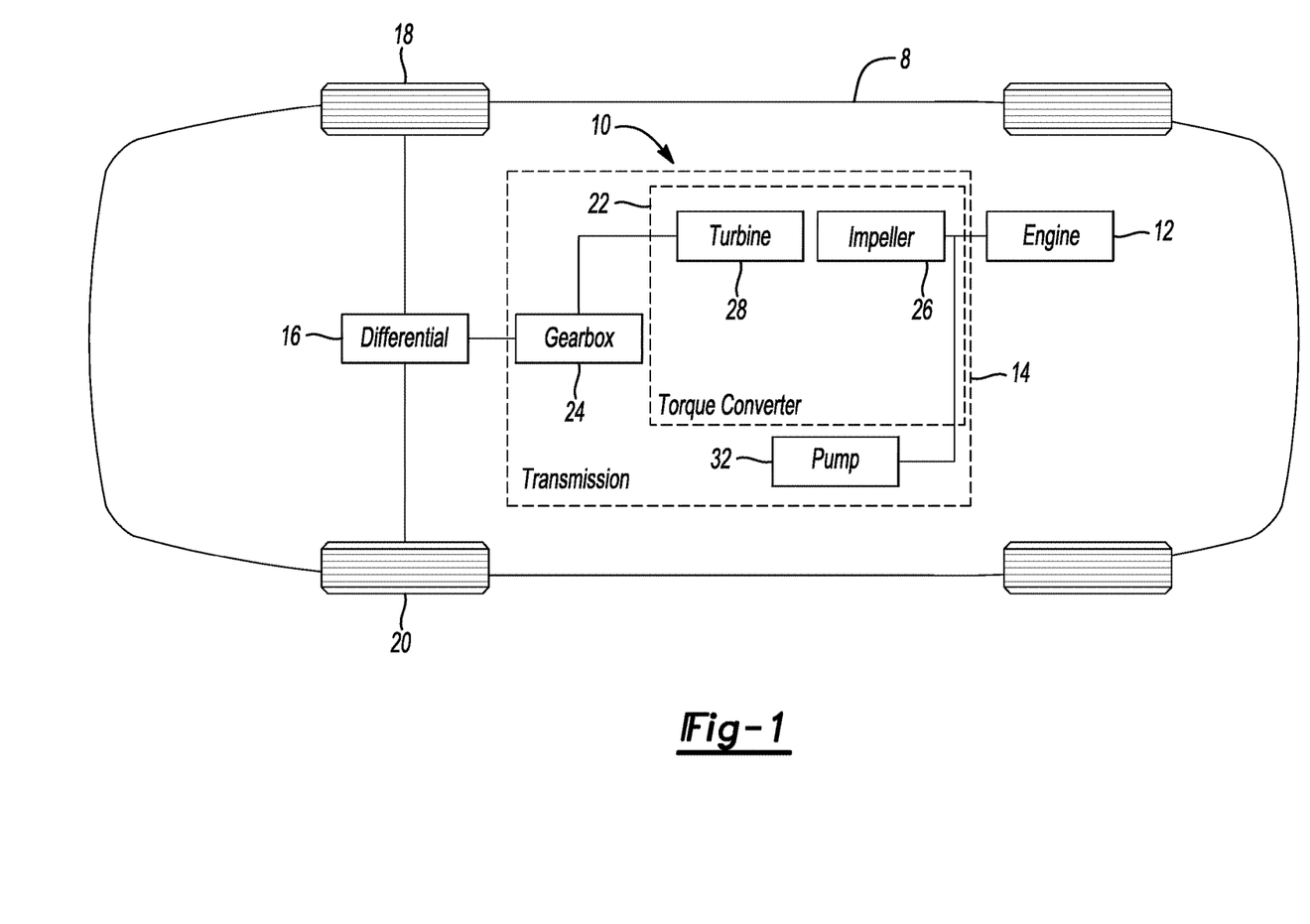
FIG. 1 is a schematic diagram of the vehicle powertrain.

Referring to FIG. 1, a vehicle 8 is schematically illustrated with solid lines represent mechanical connections such as shafts or fixed ratio gearing and dashed lines generally denoting major components such as the transmission. The powertrain 10 includes a power plant 12 (which may be an internal-combustion engine or an electric machine) that generates mechanical power by consuming energy. A transmission 14 transmits the power to a differential 16 at a shaft speed suited to current vehicle needs, which may be faster or slower than the shaft speed at which engine 12 generates the power. The differential 16 reduces the shaft speed by a fixed final-drive ratio and transmits the power to the left and right driving wheels 18 and 20, allowing for slight speed differences between the wheels as the vehicle turns a corner.

The transmission 14 may include a torque converter 22 or other launch device and a gearbox 24. The torque converter 22 includes an impeller 26 that is fixed to the engine crankshaft and a turbine 28 that is fixed to the gearbox input shaft. Torque is transferred hydro-dynamically from the impeller 26 to the turbine 28 when the impeller 26 rotates faster than the turbine 28.

The gearbox 24 includes elements for modifying a speed ratio between and an input shaft and an output shaft. The elements in the gear box vary depending upon the type of the transmission. If the transmission is a continuously variable transmission (CVT), the gearbox includes a controllable variator that is capable of producing a large amount of gear ratios. If the transmission is a step-ratio transmission, the gearbox includes a number of hydraulically-actuated shift elements. The gearbox 24 establishes different speed ratios by engaging the various elements. The transmission pump 32 provides pressurized fluid that engages the elements (such as the sheaves). Some of the power generated by the engine 12 is used to drive the transmission pump 32, reducing the power delivered to the differential 16. In order to maximize the percentage of power delivered to the differential 16 and thus reduce the amount of fuel consumed by engine 12, it is desirable to minimize the power consumption of transmission pump 32. This can be done by reducing line pressure within the transmission and/or by reducing the size of the pump.

Figure 2A:
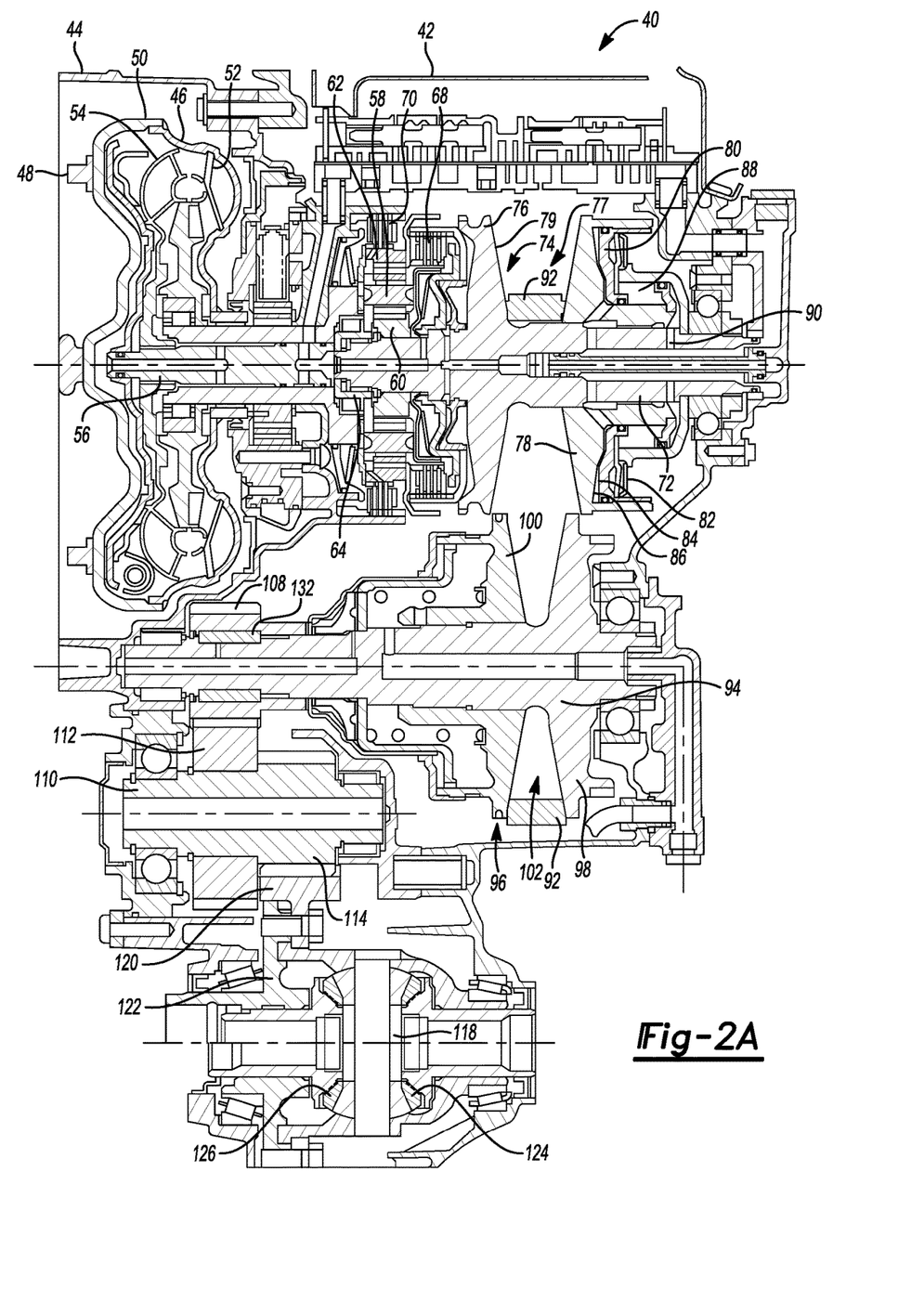
FIG. 2A is a top view, in cross section, of an example continuously variable transmission.

Referring to FIG. 2A, a CVT 40 includes a housing 42 that is connected to a bell housing 44, which bolts to the back of the engine 12. A torque converter 46 is disposed within the bell housing 44 and is connected to a crankshaft of the engine 12 via mounting hardware 48 (such as a flex plate). The mounting hardware 48 is connected to the impeller housing 50, which causes the impeller housing 50 to spin with the crankshaft. The impeller housing 50 defines a plurality of impeller blades 52 that cooperate with the blades of the turbine 54 to define a toroidal-fluid-flow circuit. During operation, a fluid connection between the impeller 52 and the turbine 54 transfers torque from the impeller 52 to the turbine 54. The turbine 54 may be splined to a turbine shaft 56 that is supported for rotation within the housing 42. The turbine shaft 56 is driveably connected to a planetary gear set 58. Two components are driveably connected if they are connected by a power flow path that constrains their rotational speeds to be directly proportional. For example, the turbine shaft 56 may be splined to the carrier assembly 64.

A drive shaft 72 is supported for rotation within the housing 42 such that the shaft 72 and the turbine shaft 56 are substantially coaxial. The drive shaft 72 is also known as an input shaft or a primary shaft. The drive shaft 72 may be splined to the sun gear 60 of the planetary gear set 58. A forward clutch 68 selectively couples the shaft 72 with the planetary gear set 58 to drivably connect the turbine shaft 56 to the shaft 72. For example, the forward clutch 68 may couple the carrier 64 to the shaft 72 providing a 1:1 drive ratio from the turbine shaft 56 to the drive shaft 72.

The transmission 40 also includes a reverse clutch 70 which may also be referred to as a brake. When engaged, the reverse clutch 70 couples the ring gear 62 to the housing 42. With the ring gear locked to the housing, torque supplied to the carrier 64 causes the sun gear 60 to turn in a direction opposite the carrier 64. The drive shaft 72 is splined to the sun gear 60 causing the drive shaft 72 to rotate in a reverse direction when torque is supplied.

Rather than having discrete gear ratios, the CVT 40 includes a variator for modifying a speed ratio between a pair of shafts. The variator may include a pair of sheave assemblies driveably connected by a tension member. In one embodiment, the shaft 72 carries a sheave assembly 74 including a stationary disk 76 and a movable disk 78 that is slidably received on the drive shaft 72. The stationary disk 76 may be integrally formed with the shaft 72. The disks 76, 78 cooperate to define a belt (or chain) receiving portion 77. In one embodiment, the movable disk 78 may be coupled to the shaft 72 by a ball spline mechanism that includes a series of balls that register with internal and external grooves formed on the disc and on the shaft, respectively. The movable disk 78 cooperates with a fixed annular piston 80, which is received in an annular cylinder 82. Another annular piston 84 is secured to a clutch-disc cylinder 86. The piston 84 cooperates with the cylinder 86 to define a pressure chamber 88. Pressure is generated within the chamber 88 by circulating fluid to the chamber via a passageway 90 defined in the shaft 72.

A tension member 92 (e.g., a belt or a chain) is clamped between juxtaposed conical surfaces 79 of the disks 76, 78. The belt frictionally engages the conical surfaces of the disks to transfer power from the shaft 72 to the tension member 92. The tension member 92 may be made of steel. The working pitch radius of the tension member 92 may be changed by moving the discs towards or away from each other. The movable disk 78 may be adjusted by supplying oil to the pressure chamber 88.

The transmission 40 also includes a driven shaft 94 (also known as an output shaft or a secondary shaft). Used herein, an "output shaft" is a shaft whose speed is proportional to an average wheel speed independent of the transmission ratio. The driven shaft 94 is supported by the transmission housing 42 for rotation about an axis that is substantially parallel to the axis of the drive shaft 72. The driven shaft 94 includes a second sheave assembly 96 having a stationary disk 98 and a movable disk 100 that is slidably received on the shaft 94. The discs 98, 100 define a belt receiving area 102. Similar to the first sheave assembly 74, the movable disk 100 may be actuated to modify a working pitch radius of the belt 92. The belt 92 is connected to both the drive shaft 72 and the driven shaft 94 to driveably connect the shafts in order to transmit power from the drive shaft 72 to the driven shaft 94. The sheave assemblies 74, 96 cooperate in tandem in order to create a drive ratio between the drive shaft 72 and the driven shaft 94. By adjusting the variator, a torque ratio between the shafts may be increased or decreased as desired.

The driven shaft 94 includes an output gear 108 that is fixed relative to the shaft 94. The gear 108 meshes with a first gear 112 fixed to a countershaft 110. The countershaft also includes a second gear 114 that is also rotationally fixed to the countershaft 110. The countershaft 110 drivably connects the driven shaft 94 with a differential 118. The differential 118 is drivably connected to the driven wheels via one or more axles (also known as half shafts). For example, the differential 118 includes a ring gear 120 that meshes with the second gear 114. The ring gear 120 is fixed with a differential carrier 122. Driver pinions that are disposed on the carrier mesh with different side gears 124, 126, which in turn, are drivably connected to the half shafts.

During certain driving conditions, the transmission may experience a sudden torque shock from the driveline. This sudden torque shock may cause the belt to slip on one or more of the sheave assemblies. This slipping may cause wear on the belt and/or the disks. The wear may create grooves in the disks, which prevents the belt from easily riding along the sheaves to change gear ratios. This wear may also reduce belt life. One example event that causes torque shock is wheel hop. During wheel hop, at least one of the driven wheel temporarily leaves the ground (causing rapid acceleration of the wheel) and then reconnects with the pavement (causing rapid deceleration of the wheel). The shock wave from the wheel travels to the transmission-output shaft and causes the output shaft to rapidly decelerate. This rapidly deceleration creates a large speed differential between the belt and the output shaft, which causes slip if the friction force between the shaft and belt is exceeded. The typical solution to this problem is to increase the friction force between the belt and shaft by increasing the line pressure (up to 1000 pounds/square inch) to the sheave assemblies. But, increasing line pressure requires the transmission pump to have a higher duty cycle. This reduces fuel economy and places higher stress on the seals.

In order to prevent damage to the transmission due to wheel hop (or similar situation), a clutch 132 may be disposed on one of the output shafts (e.g., shaft 94 or shaft 110) to selectively decouple a gear from its corresponding shaft during a possible torque-shock event. For example, output shaft 94 may include a clutch 132 that selectively couples, and decouples, the output gear 108 to the shaft 94. The clutch 132 may be biased to the engaged position (with springs or other means), and actuatable to a disengaged position decoupling the gear from its respective shaft to allow the gear and shaft to rotate independently of each other. By doing this, torque from the driveline is not transmitted to the secondary shaft 94 and the potential for slippage between the tension member 92 and the discs of the variator is eliminated. The clutch 132 may be any mechanism capable of coupling and decoupling a gear from a respective shaft. In one embodiment, the clutch is a selectively actuatable clutch. The selectively actuatable clutch may be a magnetically actuatable clutch operable to decouple the gear and shaft in response to a magnetic field being generated in a vicinity of the clutch.

Figure 2B:
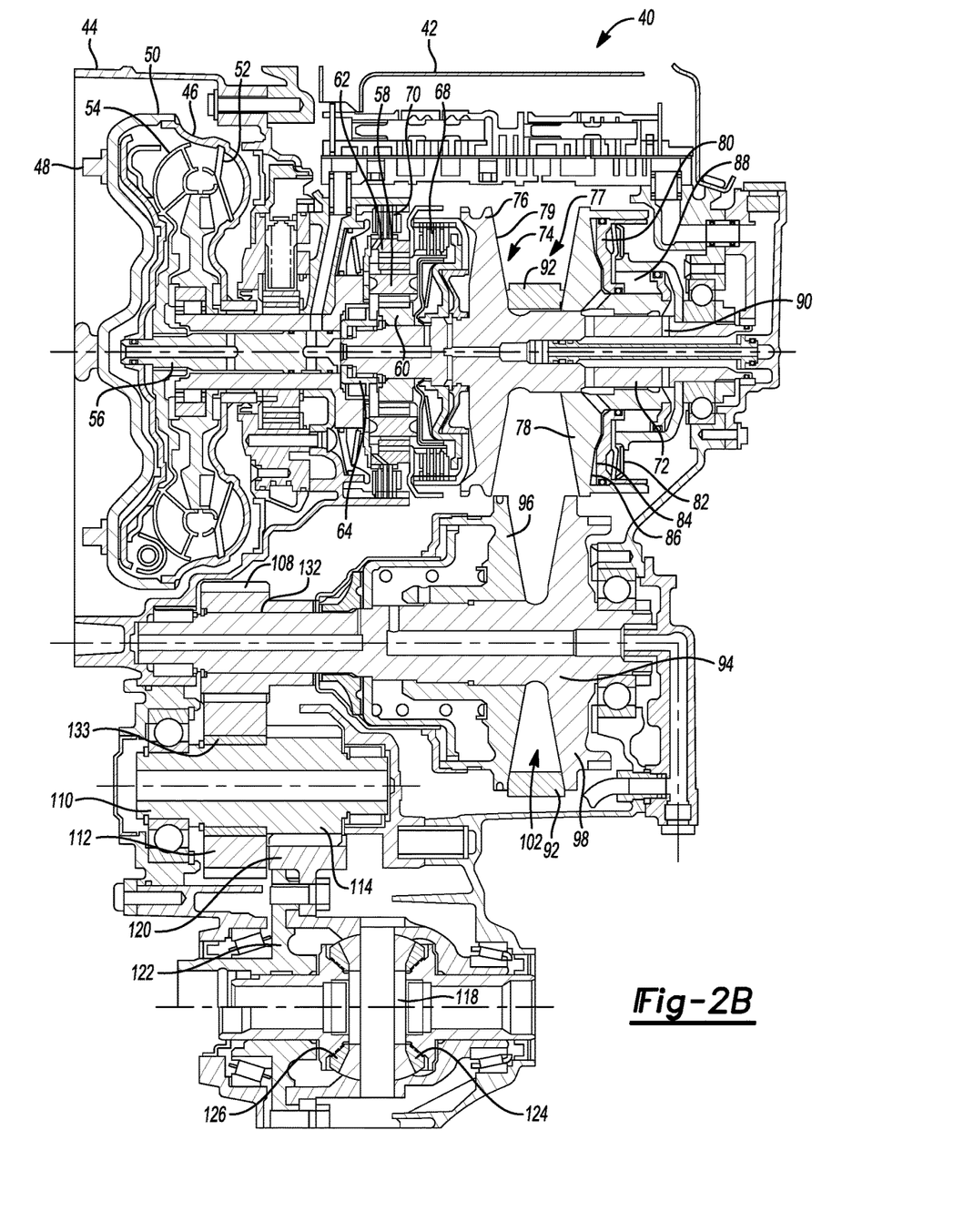
FIG. 2B is a top view, in cross section, of an example continuously variable transmission according to another embodiment.

The clutch (such as clutch 132) may be placed on any of the output shafts of the transmission. Referring to FIG. 2B, in another example embodiment, the output shaft 110 may include the clutch rather than output shaft 94. For example, a clutch 133 is disposed on the output shaft 110. The clutch 133 selectively couples the first gear 112 to the shaft 110. The clutch 133 may be biased to the engaged position, and actuatable to a disengaged position decoupling the gear 112 from shaft 110 allowing the gear and shaft to rotate independently of each other. By doing this, torque from the driveline is not transmitted to the secondary shaft 94 and the potential for slippage between the tension member 92 and the discs of the assembly 96 is eliminated. The clutch 133 could instead be associated with gear 114.

FIGS. 2A and 2B are merely two examples of a CVT. A person having ordinary skill in the art will understand that other CVT arrangements are known in the art and will appreciate that the clutch of this disclosure may be used in conjunction with those arrangements without departing from the scope of this invention. For example, U.S. Pat. No. 5,514,047 discloses other CVT arrangements.

Figure 3:
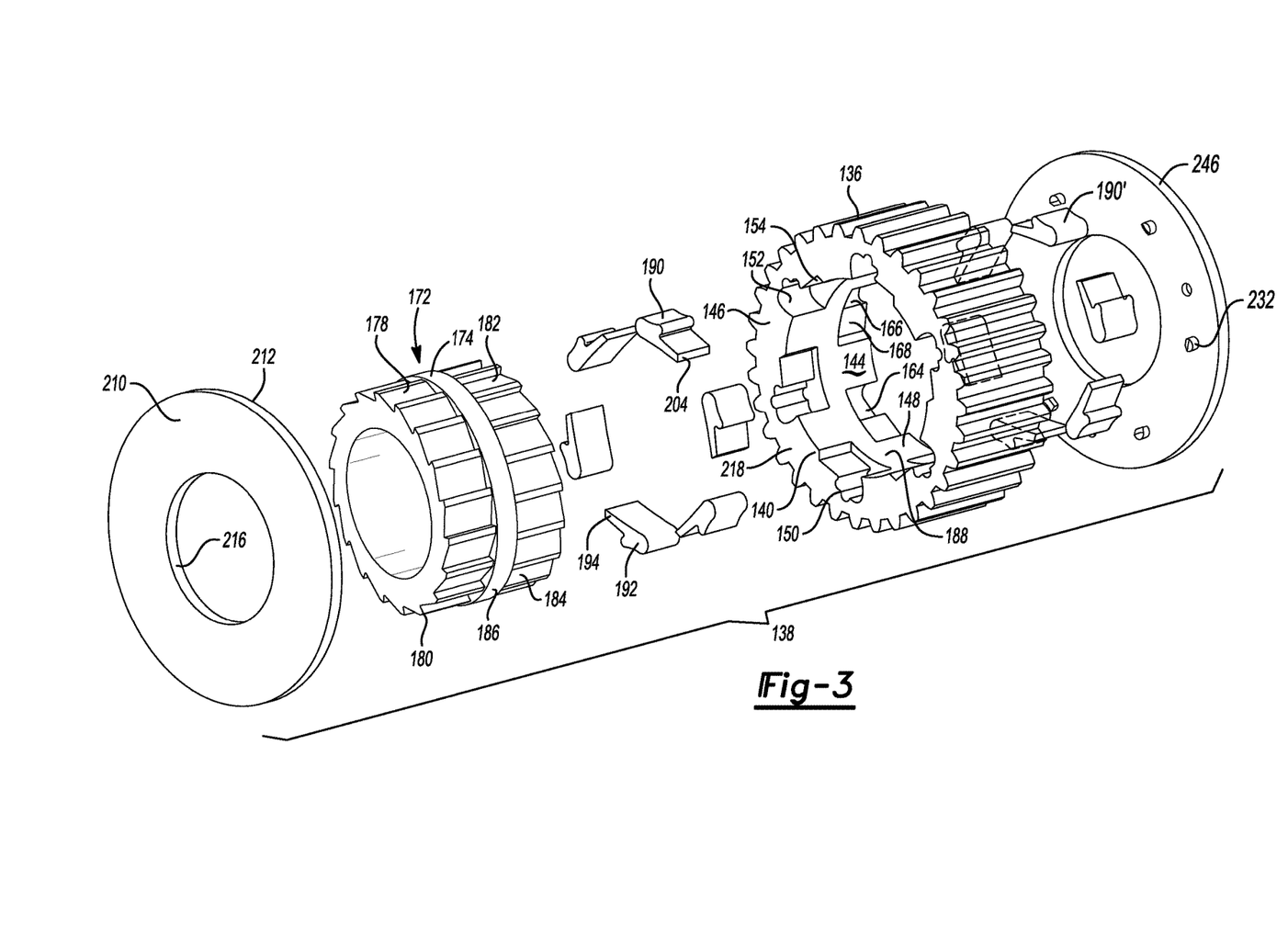
FIG. 3 is an exploded view of an example clutch of the transmission shown in FIG. 2A.
Figure 4:
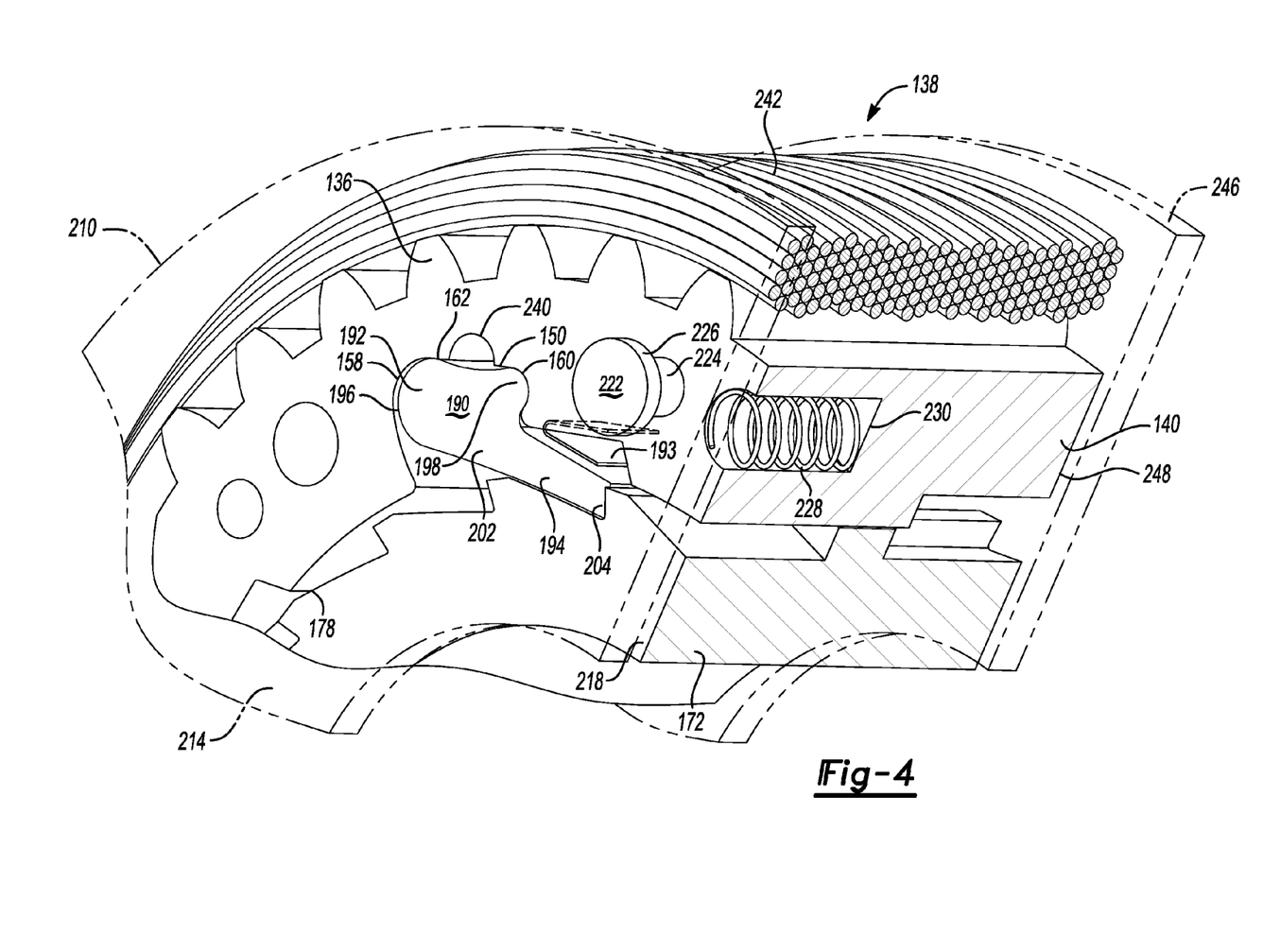
FIG. 4 is a perspective view of a portion of the clutch.
Figure 5:
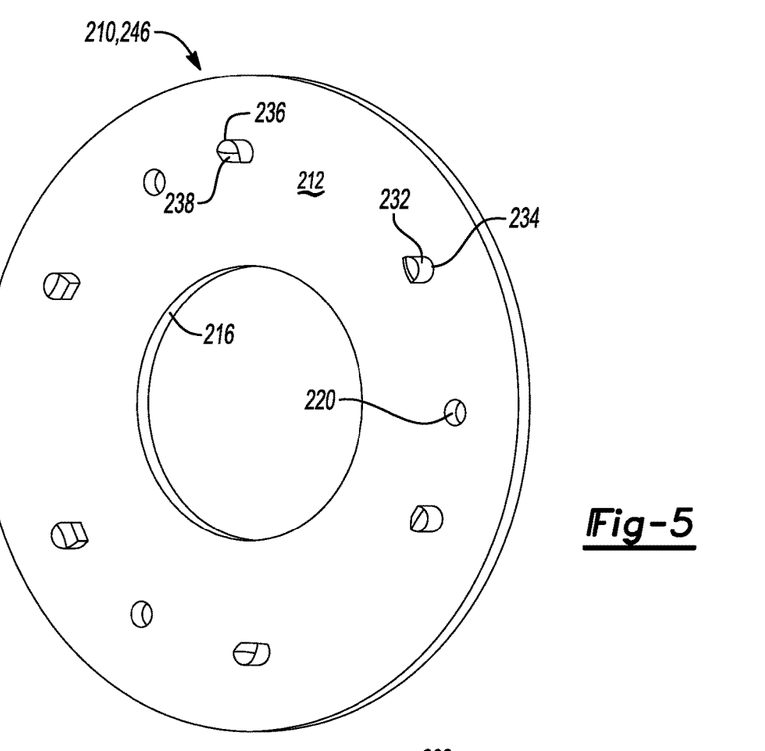
FIG. 5 is a perspective view of an armature of the clutch.

Referring to FIGS. 3, 4 and 5, an example clutch 138 includes an inner race 172 that is fixed to an output shaft and an outer race 140 that may be integrally formed with a gear 136 supported for rotation about the output shaft. In an alternative design, the outer race 140 could include an outer surface that is attached to the gear. The outer race 140 defines an inner surface 144 that circumscribes the outer surface 174 of the inner race 172. The races are sized such that the inner race 172 may freely rotate within the outer race 140 when the clutch is disengaged allowing the gear 136 and the shaft to rotate independently of each other.

The outer race 140 may include a first half 146 and a second half 148. The inner surface 144 of the first half 146 defines a plurality of first pockets 150. Each of the pockets 150 is configured to receive a pawl 190 therein. Each of the pockets may include a deep portion 152 and a shallow portion 154. The deep portion 152 receives the main body portion 192 of the pawl 190 and the shallow portion 154 is configured to receive the arm 194 of the pawl 190.

The second half 148 defines a plurality of second pockets 164 each having a deep portion 166 and a shallow portion 168. The second pockets 164 each receive one of the pawls 190' therein. The pockets 150 and the pockets 164 are oriented in opposite directions. For example, the shallow portion 154 extends in a clockwise direction from the deep portion 152, and the shallow portion 168 extends in a counterclockwise direction from the deep portion 166. As will be explained below in more detail, this allows the clutch to lock in both directions of rotation.

The outer surface 174 of the inner race defines a first cam surface 178 having teeth 180 and a second cam surface 182 having teeth 184. The cam surfaces are configured to engage with the arms 194 of the pawls 190 to lock the inner and outer races relative to each other. Similar to the pockets, the teeth of the cam surfaces 178, 182 are oriented in opposite directions relative to each other allowing the clutch to lock in both directions of rotation. For example, the first cam surface 178 prevents the outer race 140 from rotating in the clockwise direction, and the second cam surface 182 prevents the outer race 140 from rotating in the counterclockwise direction when the pawls 190 are each in the deployed position. The inner race 172 also includes a bearing surface 186 disposed between the first and second cam surfaces. The bearing surface 186 is smooth and is configured to ride on a bearing surface 188 of the outer race 140. The inner race 172 may be splined (or fixed using other known means) to its respective shaft, or may be integrally formed with the shaft.

Each of the pawls 190, 190' are disposed in one of the pockets 150, 164 of the outer race 140. For example, the body portion 192 is rotatably received within the deep portion 152 of the pocket, and the arm 194 is rotatably received within the shallow portion 154. Each of the pawls 190 are rotatable between a deployed position in which the arm 194 extends out of the pocket and engages with the cam surface 178, and a tucked position in which the arm 194 is received within the shallow portion 154 to disengage the pawls 190 and the cam surface. The pawls 190' function in the same way. The clutch 138 is locked when the pawls are in the deployed position and is unlocked when the pawls are in the tucked position. Each of the pawls 190 includes a back lobe 196 that that rides on a curved wall 158 of the pocket, and a front lobe 198 that rides on a curved second wall 160. The arm 194 includes a proximal end 202 that is adjacent to the front lobe 198 and a distal end 204 that engages with corresponding teeth of the cam surface 178. The pawls 190' include similar features. The pawl and the pockets are sized to have slight play allowing the pawls to easily rotate within the pockets. The mass of each of the pawls may be balanced such that centrifugal forces generated by rotation of the outer race 140 bias the pawls in the deployed position to engage the inner race 172. A spring 193 may be disposed in each of the pockets to bias the pawls to the deployed position.

The clutch 138 also includes a first annular armature 210 that is slidably connected to the gear 136. The armature 210 is operable to move the pawls 190 between the tucked and deployed positions. The armature 210 includes an inner surface 212 that faces the planer side 218 of the gear 136 and an outer surface 214 that faces away from the gear. The armature 210 defines an inner bore 216 that is sized to receive the shaft therethrough. The armature 210 may be steel or other magnetically permeable material.

The armature 210 may be secured to the gear 136 via a plurality of rivets 222. The armature 210 defines bores 220 having a bearing surface that slides along a post 224 of the rivet 222. A head 226 of the rivet prevents the armature from sliding off the post 224. One or more springs 228—that are received in holes 230 defined in the gear 136—bias the armature 210 away from the gear.

The armature 210 includes a plurality of pins 232 extending from the inner surface 212. Each of the pins includes a base 234 that connects to the inner surface 212 and a head 236 at the distal end of the pin. The head 236 may include a tapered surface 238 forming a wedge. Each of the pins 232 are aligned with cutouts 240 defined in the outer race 140 such that the pins may slide in and out of the cutouts 240 when the armature 210 slides along the rivets 222. The cutouts 240 are each adjacent to a corresponding first pocket 150. The cutouts 240 may be a half-moon cutout that is formed in the wall 162 of the pocket 150.

The clutch 138 may include a second armature 246 slidably disposed on the second planer side 248 of the gear 136. The second armature 246 may be identical to the first armature 210 and operate in a similar manner. The second armature 246 is used to control the pawls 190' that engage with the second cam surface 182. The second armature 246 also includes pins that engage with the pawls 190' disposed in the second pockets 164 to rotate the pawls 190' into the tucked position to disengage the second cam surface from the pawls.

The clutch 138 may be a magnetically actuatable clutch that uses a magnetic field to actuate the armature towards the gear 136. The clutch 138 includes a coil 242 that generates a magnetic field to attract the permeable armature 210 and 246 towards the gear. The coil 242 may be a stationary component that is disposed next to the gear 136. The coil 242 may circumferentially extend around a portion of the outer curved surface of the gear 136 on a side where the gear does not engage with a corresponding gear. The magnetic field is strong enough to overcome the force of the springs 228 causing the inner surfaces 212 to move toward their respective first and second planer sides 218, 248. This movement of the armature 210 causes the pins 232 to slide within the cutouts 240 and engage with the pawls 190. Similar action occurs with the other armature 246. The pins 232 cause the pawls 190 to rotate to the tucked position when the pins engage with the pawls to decouple the inner and outer races.

Figure 6A:
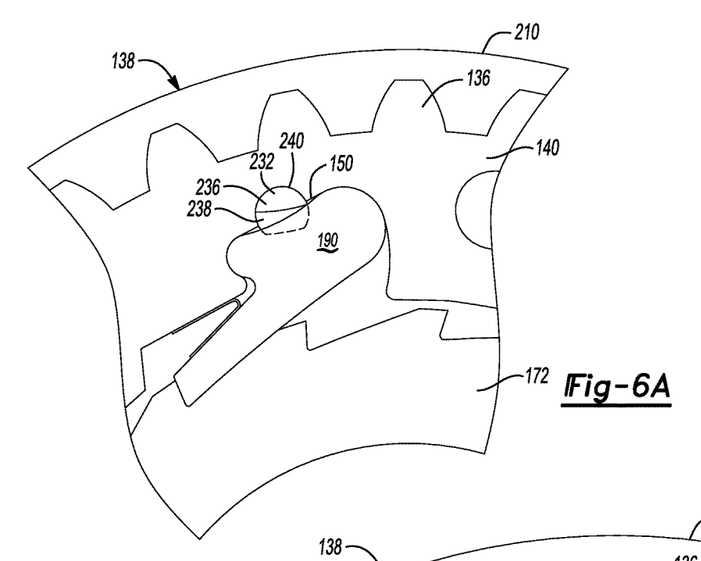
FIG. 6A is a diagrammatical view illustrating the clutch in a locked position.

FIG. 6A illustrates the clutch 138 in its default position (locked). The springs 228 bias the armature away from the gear 136 and the pins 232 are disengaged with the pawls 190. The pins 232 may be completely out of the cutouts 240, or the head of the pins may be at least partially disposed within the cutouts 240. Because of the tapered surface 238, a portion of the pins may be within the cutouts 240 without engaging the pawls 190.

Figure 6B:
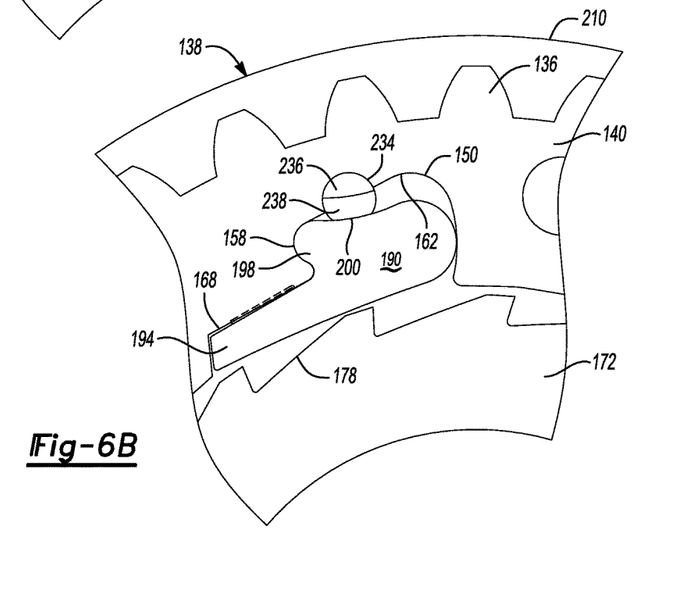
FIG. 6B is a diagrammatical view illustrating the clutch in an unlocked position.

FIG. 6B illustrates the clutch 138 in its actuated position (unlocked). The clutch is actuated to the unlocked position by energizing the coil 242 (not shown) causing the armature 210 to actuate the pawls 190 to the tucked position. In the unlocked position, each of the pins 232 has slid forward to wedge the pin-engaging surface 200 of the pawl 190 away from wall 162 of the pocket 150. This causes the front lobe 198 to pivot about the first wall 158 causing the arm 194 to rotate into the shallow portion 168 and disengage from the cam surface 178. The pawls 190 will remain in the tucked position until the pins 232 are retracted from the cutouts 240.

Figure 7:
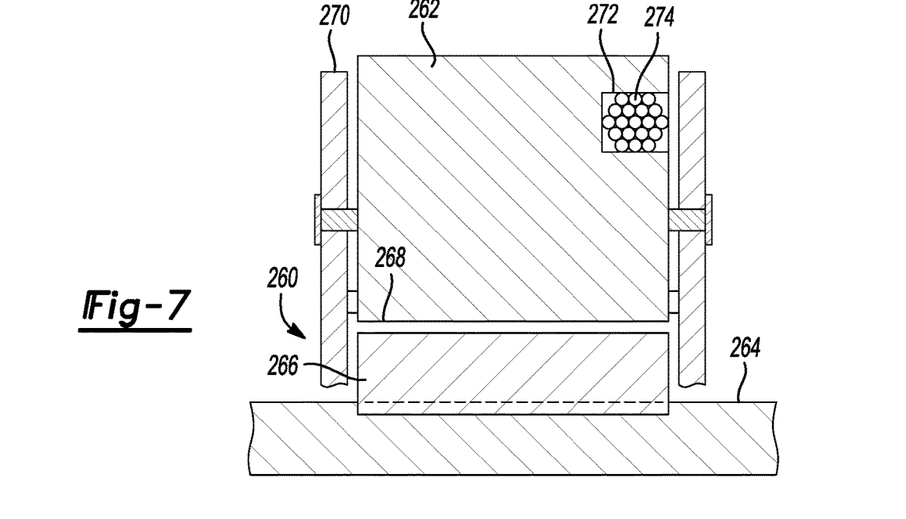
FIG. 7 is a diagrammatical view of another clutch.

Referring to FIG. 7, a gear 262 is supported for rotation about an output shaft 264. A clutch 260 is used to selectively couple and decouple the gear 262 from the output shaft 264. The clutch 260 includes an outer race 268 that is fixed to the gear 262, and an inner race 266 that is fixed to the shaft 264. The gear 262 may define the outer race 268. The clutch 260 is similar to clutch 138 except that the coil 274 is received within a portion of the gear 262. For example, the gear 262 defines a slot 272 that receives the coil 274 therein. The coil 274 controls the armatures 270 that are used to engage and disengage the pawls to couple and uncouple the inner and outer races to each other as described above. In this embodiment, the coil 274 rotates with the gear 262.

As explained above, the clutch may be operated to decouple the gear from the shaft during a torque-shock event, such as, wheel hop. The torque-shock event may be identified by measuring the speeds of various drivetrain components and determining, via a vehicle controller, if a torque disturbance is present based on the relationships between the measured speeds.

Figure 8:
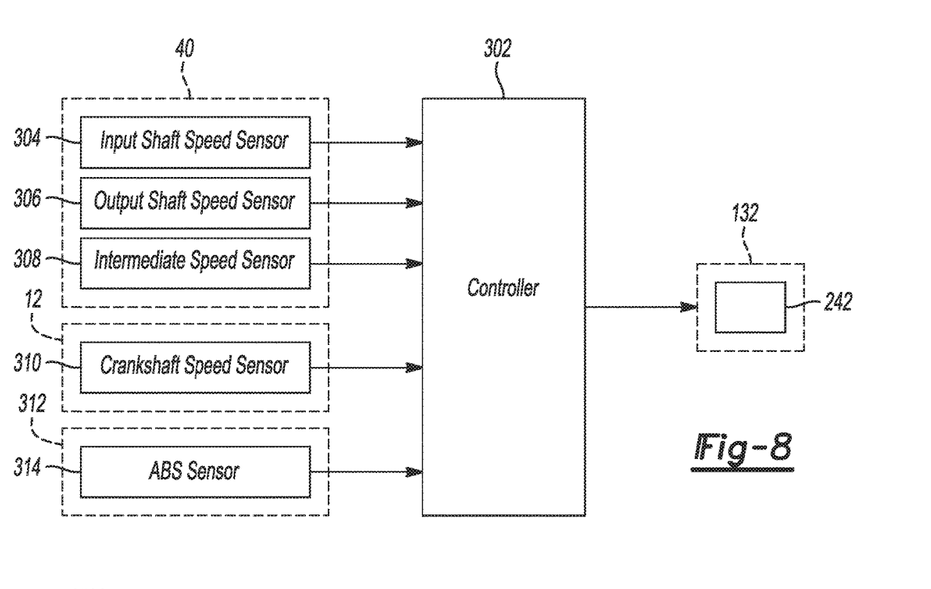
FIG. 8 is a control diagram of a vehicle-control system.

Referring to FIG. 8, the vehicle 8 includes a controller 302 (such as a powertrain-control module) for coordinating and controlling various functions of the vehicle. While illustrated as one controller, the controller 302 may be part of a larger control system and may be controlled by various other controllers throughout the vehicle 8, such as a vehicle-system controller (VSC). Any reference in the written description or claims to "a controller" means "one or more controllers." It is to be understood that the powertrain-control unit 302 and one or more other controllers can collectively be referred to as a "controller" that controls various actuators in response to signals from various sensors to control functions such as operating the clutch 132, and select or schedule transmission shifts, etc. The controller 302 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine, transmission, or other vehicle systems.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 8, the controller 302 may communicate signals to and/or from the engine 12, the transmission 40, the wheel assembly 312, and the clutch 132. Although not explicitly illustrated, those of ordinary skill in the art will recognize various functions or components that may be controlled by controller 302 within each of the subsystems identified above.

Control logic or functions performed by controller 302 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 302. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The transmission 40 may include various speed sensors configured to send speed signals to the controller 302. For example, the transmission 40 includes an input shaft speed sensor 304 configured to output a signal indicating the speed of the input shaft. The transmission also includes an output shaft speed sensor 306 configured output a signal indicating the speed of the output shaft. In one embodiment, the sensors are hall-effect type sensors. Of course, other types of speed sensors may be used.

The transmission 40 may also include one or more intermediate speed sensors 308 that output a signal indicating the speed of one or more of the sheaves or counter shafts. The intermediate speed sensors are optional. The engine 12 includes a crankshaft speed sensor 310 configured output an engine speed to the controller, and the wheel assembly 312 includes an ABS sensor 314 configured to output a wheel speed to the controller 302. The controller 302 includes one or more algorithms that converts the speed signal into torques according to well-known techniques. The controller 302 also includes one or more algorithms that detect a torque disturbance (such as wheel hop) based on relative torques between the various measured components. If the controller 302 determines, for example, that wheel hop is occurring, then the controller 302 outputs a signal energizing the electric coil 242 to open the clutch 132 until the disturbance subsides.

Figure 9:
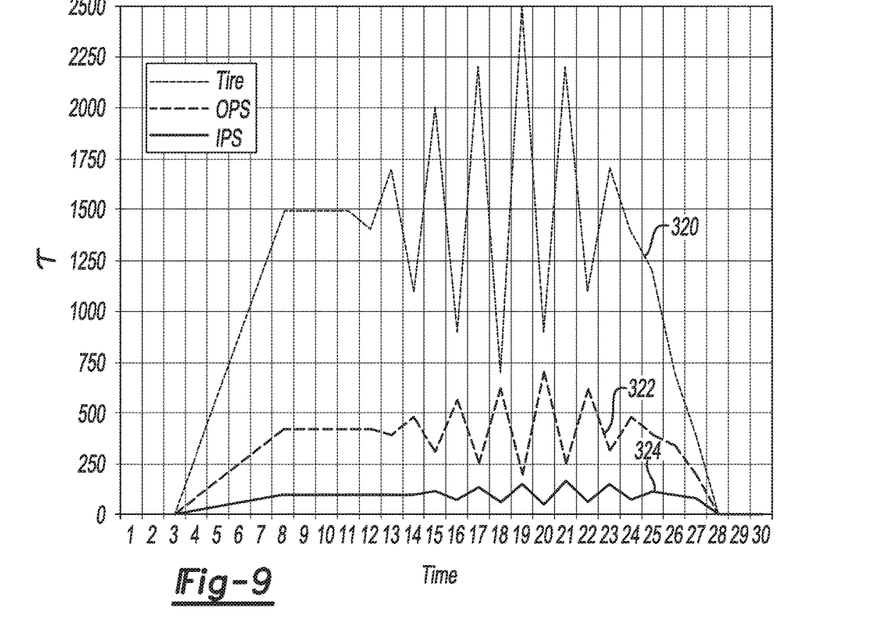
FIG. 9 is plot illustrating torques of drivetrain components during a wheel hop event.

According to one embodiment, wheel hop is determined based on the input-shaft speed, the output-shaft speed, and the speed of the driven wheels. FIG. 9 illustrates torques of the driven wheel(s) (trace 320), the output shaft (trace 322), and the input shaft (trace 324) during an example wheel-hop event. The vehicle is stationary from time zero until time 3. At time 3, the driver depresses the accelerator pedal and the engine begins to produce torque, which is routed to the driven wheels by the drivetrain. The torque accelerates smoothly from time 3 until wheel hop begins at time 11. The disturbance is first sensed at the driven wheels as this is the starting location for the shockwave. At time 11 the wheel torque 320 suddenly dips when the tire jumps off the road and then spikes when the tire re-engages with the road creating the torque oscillations shown. These torque oscillations continue until the wheel hopping subsides at time 25. Since wheel hop occurs at the wheels, torque oscillations are first sensed by the ABS sensor 314 at time 11, then by the output shaft speed sensor 306 at time 12, and finally by input shaft speed sensor 304 at time 14. Also, the torque oscillations first stop at the wheels, then the output shaft, and finally at the input shaft.

Wheel hop is perceivable by the driver. As such, drivers naturally attempt to mitigate wheel hop once they realize it is occurring. The driver may mitigate wheel hop by letting off the accelerator pedal and/or applying the friction brakes. Driver reaction times vary greatly, and generally are much slower than that of the controller 302. As such, an automated mitigation strategy may substantially reduce the number of hops that occur during a wheel-hop event by more quickly detecting the event and taking steps to mitigate it.

The torque phases of the components may be used by the controller 302 to determine wheel hop by detecting a torque shockwave in the drivetrain. As shown in FIG. 9, the traces 320, 322, and 324 are all out of phase with each other. This indicates that a shockwave is traveling through the drivetrain. Based on the starting times of the torque oscillations, the direction of the shockwave can be determined, which is useful in determining if the torque shockwave is coming from the wheels or the engine. Here, the oscillations are first detected at the wheels and last detected at the input shaft, which indicates the shockwave is traveling from the wheels towards the engine. Because the shockwave is traveling from the wheels, the controller determines that wheel hop is the cause of the shockwave.

Figure 10A:
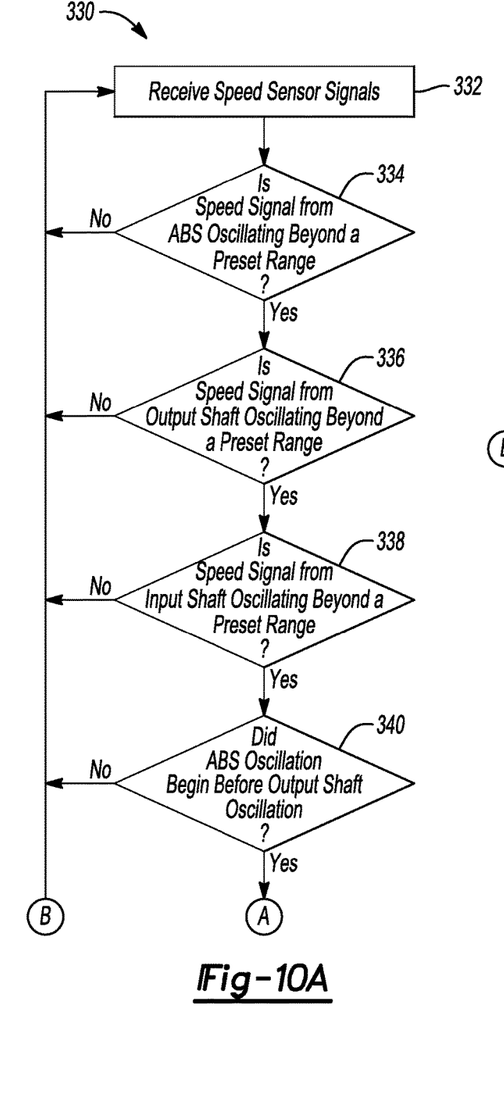
FIGS. 10A and 10B illustrate a flow chart of an algorithm for detecting wheel hop.
Figure 10B:
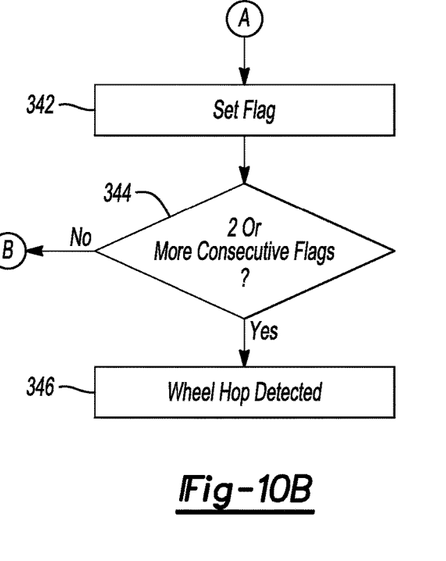

Example flow chart 330 illustrates one method for detecting wheel hop. At operation 332 the controller 302 receives speed signals from the various components within the transmission. At operation 334 the controller determines if the speed signal from the ABS sensor 314 is oscillating beyond a preset range. The preset range may be between 5 and 20 hertz. If no, control loops back to operation 332. If yes, the time is marked and control passes to operation 336, and controller determines if the speed signal from the output-shaft sensor 306 is oscillating beyond a preset range. If yes, the time is marked and the controller then determines if the speed signal from the input-shaft sensor 304 is oscillating beyond a preset range at operation 338. If no, control passes back to 332. If yes, the time is marked. Additional tests may be applied for the intermediate speed sensor(s) 308 if provided. Operations 334 through 338 are used to determine if a shockwave event is occurring within the drivetrain. If the speed signals are all oscillating beyond the preset range, this indicates a shockwave is present in the drivetrain. But, merely detecting oscillations is insufficient to determine if they are being caused by the wheels or by some other component, such as the engine. At operation 340 the controller determines the direction of the shockwave by determining if the ABS oscillations began before the output-shaft oscillations by comparing the marked times from above. If the oscillations began at the wheels then wheel hop may be occurring. At operation 342 a flag is set if the oscillations are first sensed by the ABS sensor 314 and subsequently sensed by the output shaft and then the input shaft sensors. At operation 344 the controller determines if two or more consecutive flags have occurred. If yes, it is determined that wheel hop is occurring at operation 346.

The algorithm described by flowchart 330 is merely one example method for detecting wheel hop and is not to be construed as limiting. U.S. Pat. No. 8,200,404, owned by Applicant, describes another example method for determining wheel hop that may be used in conjunction with the teachings of this application. U.S. Pat. No. 8,200,404 is hereby incorporated in its entirety by reference herein.

Figure 11:
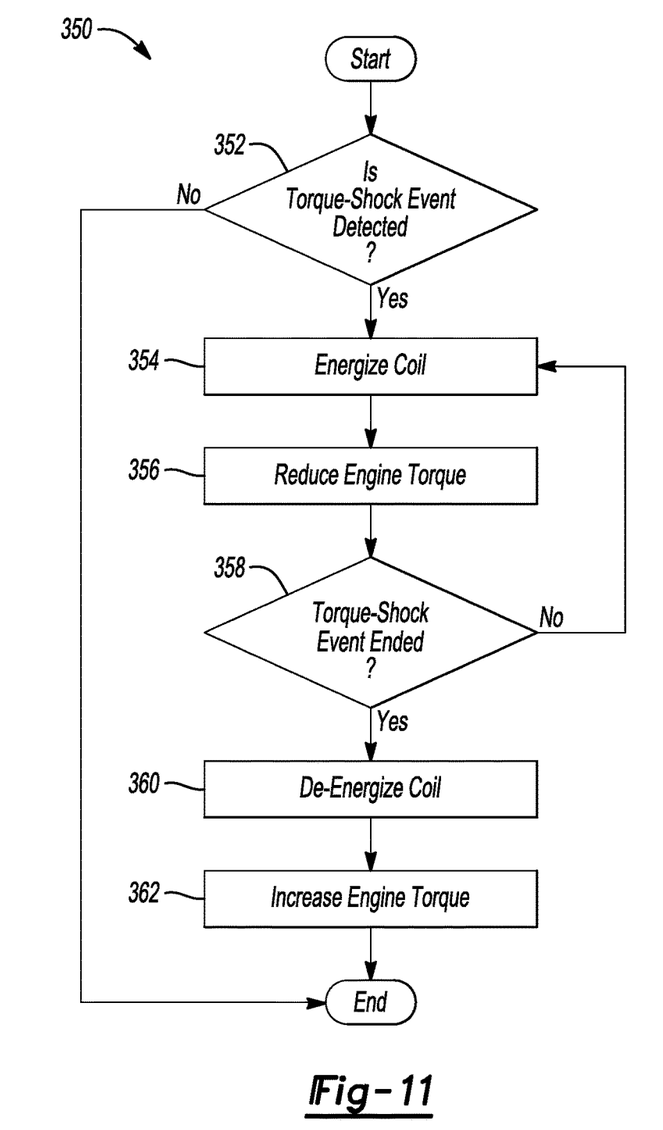
FIG. 11 is a flow chart illustrating an algorithm for controlling the clutch.

Example flow chart 350 illustrates one algorithm for operating the clutch 132 (or clutch 133) to prevent damaging the transmission and improve the driving experience during a torque-shock event. At operation 352 the controller determines if a torque-shock events is detected. If no, the routine ends. If yes, control passes to operation 354 and the controller sends a signal to the coil to energize the coil, which causes the clutch to open decoupling the gear from the shaft. When the clutch opens, the load on the engine reduces to substantial zero. To prevent over-revving and fuel waste, the engine torque is reduced at 356. The engine torque may be reduced by cutting fuel to the engine, by retarding the spark, or by any other means known in the art. At operation 358 the controller determines if the torque-shock event has ended. If the torque-shock event persists, control loops back and the clutch remains open and the engine torque remains reduced. Once the torque-shock event ends, control passes to operation 360 and the coil is de-energized allowing the clutch to close; re-engaging the gear and the shaft. Once the clutch is closed, the engine torque can be increased to the driver-demanded torque at operation 362. The engine torque may be increased according to one or more torque schedules stored in one or more lookup tables of the controller 302.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a continuously variable transmission including a gear selectively locked to an output shaft via a clutch actuated by an electric coil; and
    a controller configured to, in response to wheel hop being detected, energize the coil to disengage the clutch allowing the gear and the output shaft to rotate independently of each other.

2. The vehicle of claim 1, wherein the clutch is biased to lock the gear relative to the shaft.

3. The vehicle of claim 1, wherein the clutch further includes an armature actuatable by the coil to disengage the clutch in response to the coil being energized.

4. The vehicle of claim 1, wherein the clutch further includes an outer race on the gear, an inner race fixed to the output shaft, and at least one pawl biased to lock the races and actuatable to unlock the races in response to the coil being energized.

5. The vehicle of claim 4, wherein the clutch further includes an armature configured to, in response to the coil being energized, move the at least one pawl to a tucked position unlocking the races.

6. The vehicle of claim 1, wherein the wheel hop is detected based on a speed of the output shaft and a speed of a driven wheel of the vehicle.

7. The vehicle of claim 1, wherein the controller is further configured to receive a wheel-speed signal, and wherein the wheel hop is detected in response to the wheel-speed signal oscillating beyond a preset range.

8. The vehicle of claim 7, wherein the controller is further configured to receive a shaft-speed signal indicating a speed of the output shaft, and wherein the wheel hop is detected further in response to the shaft-speed signal oscillating beyond a preset range.

9. The vehicle of claim 8, wherein the wheel hop is detected further in response to the wheel-speed oscillating beyond the preset range before the shaft-speed signal oscillating beyond the preset range.

10. A vehicle comprising:
    a continuously variable transmission including a clutch having:
        an inner race fixed to an output shaft,
        an outer race fixed to a gear,
        pawls biased to a deployed position in which the pawls lock the races placing the gear and shaft in a fixed relationship, and movable to a tucked position in which the races are unlocked, and
        an armature configured to move the pawls; and
    a controller configured to, in response to wheel hop being detected, actuate the armature to move the pawls to the tucked position to unlock the races allowing the gear and shaft to rotate independently of each other.

11. The vehicle of claim 10, wherein the outer race is integrally formed with the gear.

12. The vehicle of claim 10, wherein the armature further includes pins arranged to engage the pawls to move the pawls to the tucked position.

13. The vehicle of claim 10, wherein the armature is slidably connected to the outer race.

14. The vehicle of claim 10, wherein the clutch further comprises an electric coil, and wherein the armature is actuated by a magnetic field of the coil in response to the coil be energized by the controller during wheel hop.

15. The vehicle of claim 10, wherein the wheel hop is detected based on a speed of the output shaft and a speed of a driven wheel of the vehicle.

16. The vehicle of claim 10, wherein the controller is further configured to, in response to the actuation of the armature, reduce torque of an engine of the vehicle.

17. A method of controlling an output-shaft clutch of a continuously variable transmission, the method comprising:
    in response to wheel hop being detected, energizing an electric coil to unlock the clutch allowing an output shaft that extends through the clutch to rotate independently of a gear fixed to the clutch; and in response to wheel hop ending, de-energizing the coil to lock the clutch and fix the gear to the output shaft.

18. The method of claim 17 further comprising reducing torque of an engine driveably connected to the transmission.

19. The method of claim 17 further comprising:
receiving a wheel-speed signal; and
in response to the wheel-speed signal oscillating beyond a preset range, energizing the electric coil.

20. The method of claim 19 further comprising:
receiving a shaft-speed signal indicating a speed of the output shaft; and
in response to the shaft-speed signal oscillating beyond a preset range after the wheel-speed signal oscillating beyond the preset range, energizing the electric coil.

\* \* \* \* \*